United States Patent

Suneya

(10) Patent No.: US 9,420,316 B2
(45) Date of Patent: Aug. 16, 2016

(54) CONTROL APPARATUS, REPRODUCTION CONTROL METHOD, AND RECORDING MEDIUM

(71) Applicant: CANON KABUSHIKI KAISHA, Tokyo (JP)

(72) Inventor: Toru Suneya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/243,765

(22) Filed: Apr. 2, 2014

(65) Prior Publication Data

US 2014/0301711 A1 Oct. 9, 2014

(30) Foreign Application Priority Data

Apr. 4, 2013 (JP) ................ 2013-078477

(51) Int. Cl.
*H04N 5/775* (2006.01)
*H04N 21/2343* (2011.01)
*H04N 21/218* (2011.01)
*H04N 21/2662* (2011.01)
*H04N 21/414* (2011.01)
*H04N 5/765* (2006.01)
*H04N 5/77* (2006.01)
*H04N 9/82* (2006.01)

(52) U.S. Cl.
CPC ....... *H04N 21/234381* (2013.01); *H04N 5/775* (2013.01); *H04N 21/2181* (2013.01); *H04N 21/234336* (2013.01); *H04N 21/2662* (2013.01); *H04N 21/41407* (2013.01); *H04N 5/765* (2013.01); *H04N 5/772* (2013.01); *H04N 9/8205* (2013.01)

(58) Field of Classification Search
None
See application file for complete search history.

(56) References Cited

U.S. PATENT DOCUMENTS

| 2009/0060447 A1* | 3/2009 | Nakao | H04N 5/232 386/354 |
| 2010/0281384 A1* | 11/2010 | Lyons | G06F 3/048 715/723 |
| 2012/0110616 A1* | 5/2012 | Kilar | H04N 7/17318 725/32 |

FOREIGN PATENT DOCUMENTS

| JP | 2005236462 A | 9/2005 |
| JP | 2005244605 A | 9/2005 |
| JP | 2009284055 A | 12/2009 |

* cited by examiner

*Primary Examiner* — Eileen Adams
(74) *Attorney, Agent, or Firm* — Canon USA, Inc. I.P. Division

(57) ABSTRACT

A control apparatus reproducing second moving image data of which at least one of a bit rate, a frame rate, and resolution has been converted from that of first moving image data and generating an instruction to reproduce the first moving image data to synchronously reproduce control of a plurality of pieces of moving image data having different physical characteristics.

11 Claims, 7 Drawing Sheets

CONTROL APPARATUS, REPRODUCTION CONTROL METHOD, AND RECORDING MEDIUM

BACKGROUND OF THE INVENTION

1. Field of the Invention

The present invention relates to a reproduction control apparatus and a reproduction control method, and, in particular, to a technique that is suitably used to realize synchronous reproduction control of a plurality of pieces of moving image data having different physical characteristics.

2. Description of the Related Art

In recent years, among image capturing devices such as a digital video camera, a product capable of transmitting moving image data that is being captured or has been captured to a mobile terminal such as a smartphone, subjecting the moving image data to reproduction processing in the mobile terminal, and storing the moving image data, has appeared.

Typically, moving image data to be transmitted to such a mobile terminal needs to conform to constraints with regard to display resolution of the mobile terminal, a codec and a moving image format to which the mobile terminal is compliant, a processing capability of a central processing unit (CPU), and so on. Thus, it is often the case that moving image data that has a bit rate, a frame rate, resolution, or the like converted from that of the moving image data recorded in the image capturing device is transmitted. In other words, there is a case in which moving image data that has the same content as the moving image data recorded in the image capturing device but has physical characteristics that differ in some respect is recorded in the mobile terminal.

In such a case, nowadays, captured moving image data (original moving image data) is stored not only in the form of a recording medium removed from the image capturing device but also by exporting the captured moving image data to a personal computer (PC) or a digital video recorder (DVR). Alternatively, it is becoming more popular to employ such a storage method in which the captured moving image data is stored in a network attached storage (NAS) or on a cloud server. The captured moving image data is then obtained through a network and reproduced with relative ease.

However, it is not as easy as handling the moving image data recorded in the mobile terminal to search for a desired piece of moving image data through a plurality of pieces of moving image data or to search for a specific scene within the moving image data.

The moving image data recorded in the mobile terminal is often a moving image clip of a favorite scene. Thus, it is desired that the original moving image data, which is higher in quality than the moving image clip recorded in the mobile terminal, can be searched for through a simple operation as with referring to the moving image data recorded in the mobile terminal and can be viewed on a large screen monitor or on a television set. For example, if an operation on the moving image clip recorded in the mobile terminal becomes available as an operation on the original moving image data through remote control, synchronous reproduction control on the moving image clip recorded in the mobile terminal and the original moving image data becomes possible.

Japanese Patent Application Laid-Open No. 2005-236462 discusses a technique in which, when moving image data is to be reproduced in a plurality of different terminal devices, reproduction control information for one of the terminal devices is shared among the plurality of terminal devices and reproduction timings are thus synchronized.

In addition, an apparatus described in Japanese Patent Application Laid-Open No. 2005-244605 estimates, when identical moving image content is viewed through streaming in a plurality of terminals, reproduction positions in the plurality of terminals and calculates temporal deviations among the terminals. The apparatus then instructs each of the terminals to control the reproduction position, and thus synchronous reproduction among the plurality of terminals is realized.

Furthermore, Japanese Patent Application Laid-Open No. 2009-284055 discusses a technique for achieving synchronous reproduction by transmitting an instruction for reproducing moving image to a viewing group, in which a plurality of clients that reproduces moving images distributed from a moving image distribution server participates, when notifications of completion of buffering are received from all of the clients.

However, existing techniques suffer from various difficulties when moving image data of which resolution, a bit rate, and so on have been converted from those of the original moving image data is recorded in a mobile terminal or the like so that the moving image data is easily accessible and the original moving image data is recorded in a different location. For example, it has been difficult to quickly search for the storage location of the original moving image data or to search for a particular scene within the original moving image data.

In addition, a case can be considered in which part of the moving image data that has been converted from the original moving image data is recorded in a mobile terminal at hand. In such a case, it has been difficult for a person who is at a location (e.g. remote location) where the person cannot view the reproduced image of the original moving image data to accurately describe a particular scene within the original moving image data to a person who is at a location where the person can view the reproduced image of the original moving image data.

SUMMARY OF THE INVENTION

Exemplary embodiments of the present invention make it possible to quickly search for a storage location of original moving image data or to search for a specific scene within the original moving image data.

According to an aspect of the present invention, a control apparatus includes an obtaining unit configured to obtain information for obtaining first moving image data that is stored in a storage device, a reproduction unit configured to reproduce second moving image data of which at least one of a bit rate, a frame rate, and resolution has been converted from that of the first moving image data, a generation unit configured to generate an instruction to reproduce the first moving image data based on the information obtained by the obtaining unit, and a communication unit configured to transmit, via a network, the instruction generated by the generation unit to a reproduction control device that controls a display device to reproduce the first moving image data.

Further features of the present invention will become apparent from the following description of exemplary embodiments with reference to the attached drawings.

DESCRIPTION OF THE EMBODIMENTS

Figure 1:
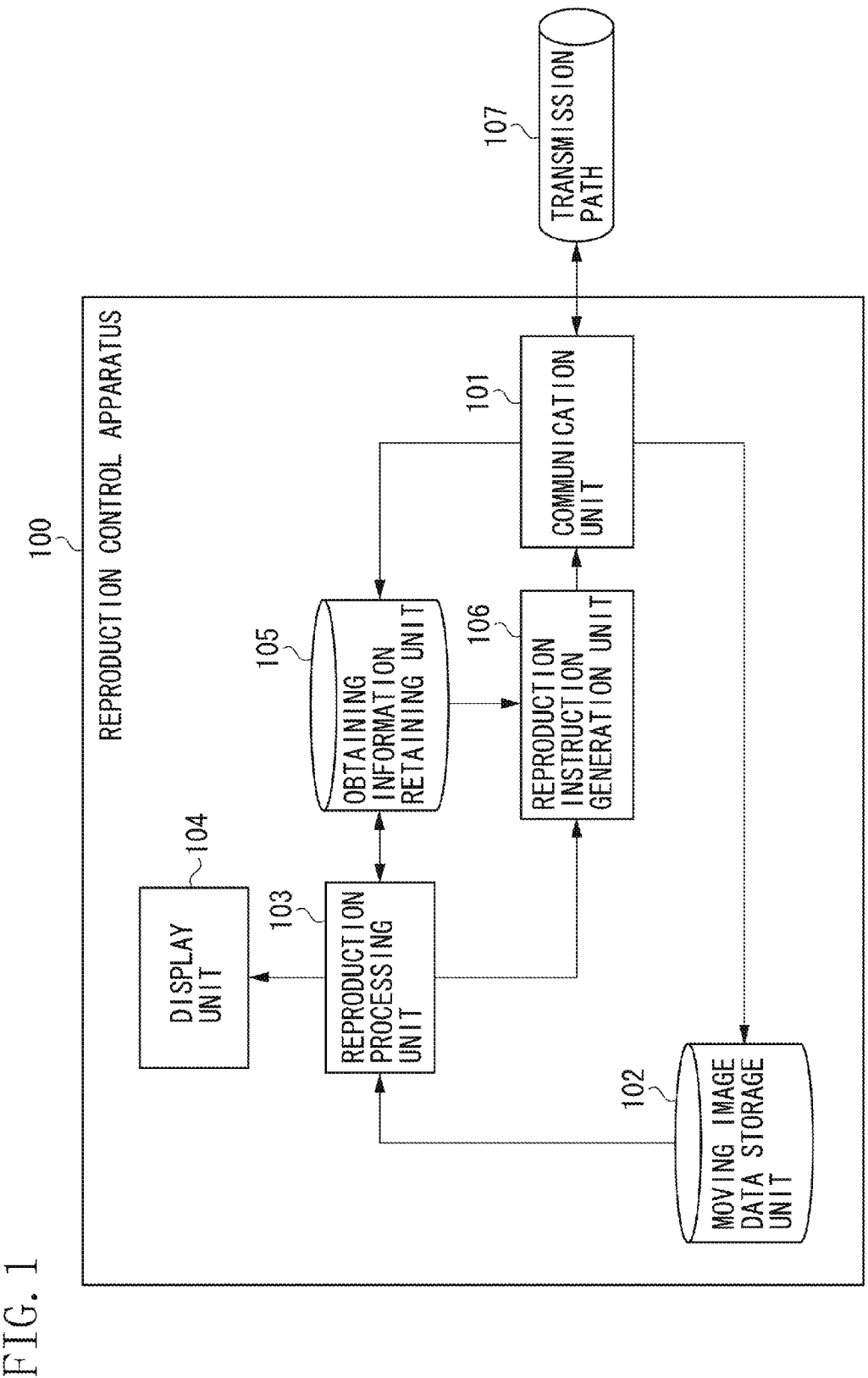
FIG. 1 is a block diagram illustrating an exemplary configuration of a reproduction control apparatus according to exemplary embodiments of the present invention.

Various exemplary embodiments, features, and aspects of the invention will be described in detail below with reference to the drawings. It is to be noted that configurations described hereinafter in the exemplary embodiments are merely examples, and the present invention is not limited to the configurations illustrated in the drawings.

FIG. 1 is a block diagram illustrating an exemplary configuration of a reproduction control apparatus according to a first exemplary embodiment of the present invention.

Referring to FIG. 1, a reproduction control apparatus 100 includes a communication unit 101, a storage unit 102, a reproduction processing unit 103, a display unit 104, a holding unit 105, and a generation unit 106.

A transmission path 107 is a network such as a 3G or 4G mobile phone communication service, the Internet, or a local area network (LAN).

The communication unit 101 is provided with a function of transmitting and receiving data, and is communicably connected to the transmission path 107. Here, the communication unit 101 may be a wireless or wired communication unit.

A moving image clip (second moving image data) that has a bit rate, a frame rate, or the like converted from that of moving image data (first moving image data) captured by an image capturing device such as a digital video camera is recorded in the storage unit 102. The moving image clip is recorded while or after the image capturing device captures the moving image data.

The reproduction processing unit 103 subjects the moving image clip recorded in the storage unit 102 to reproduction processing, and displays a reproduced image on the display unit 104. Reproduction processing methods in the reproduction processing unit 103 may include a series of reproduction control operations such as fast forward, rewind, pause, and a random access.

Information that is necessary for obtaining the original moving image data of the moving image clip recorded in the storage unit 102 is recorded in the holding unit 105. Hereinafter, such information is referred to as moving image obtaining information. The moving image obtaining information includes information that indicates a location at which the original moving image data of the moving image clip is recorded.

The generation unit 106 carries out obtaining information acquisition processing for acquiring the moving image obtaining information from the holding unit 105 in response to an instruction from the reproduction processing unit 103, and generates a reproduction instruction as to the original moving image data based on the acquired moving image obtaining information. The reproduction instruction generated by the generation unit 106 is transmitted to the transmission path 107 through the communication unit 101.

Figure 2:
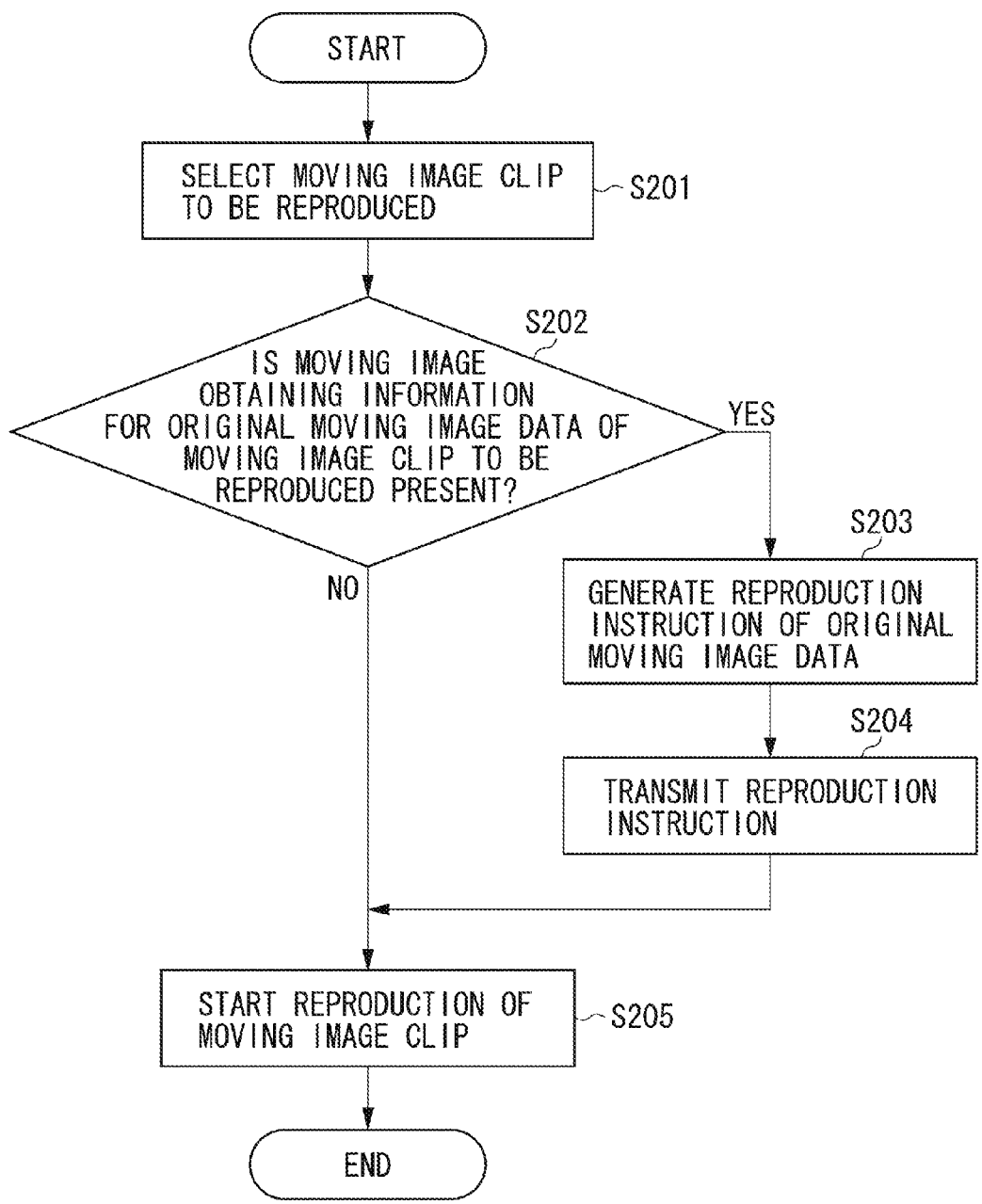
FIG. 2 is a flowchart illustrating an example of a reproduction control procedure in the reproduction control apparatus.

The reproduction control of the reproduction control apparatus 100 according to the first exemplary embodiment will now be described in detail with reference to FIG. 2. FIG. 2 is a flowchart illustrating an example of a reproduction control procedure in the reproduction control apparatus 100 according to the first exemplary embodiment.

Referring to FIG. 2, in step S201, a moving image clip to be reproduced is selected from moving image clips recorded in the storage unit 102.

In step S202, whether moving image obtaining information for the original moving image data of the moving image clip to be reproduced is recorded in the holding unit 105 is checked. If the moving image obtaining information is recorded in the holding unit 105 (Yes in step S202), in step S203, a reproduction instruction of the original moving image data is generated. The generation unit 106 generates this reproduction instruction.

In step S204, the reproduction instruction generated by the generation unit 106 is transmitted by the communication unit 101 through the transmission path 107. A receiver of the reproduction instruction is a reproduction control apparatus capable of obtaining and reproducing the original moving image data, and such a reproduction control apparatus can be, for example, a DVR, a set top box (STB) of a television set, or the like.

Thereafter, in step S205, the reproduction processing of the moving image clip starts. Meanwhile, if, in step S202, the moving image obtaining information of the original moving image data of the moving image clip is not recorded in the holding unit 105 (No in step S202), the processing proceeds to step S205, and the reproduction processing of the moving image clip starts.

Figure 3:
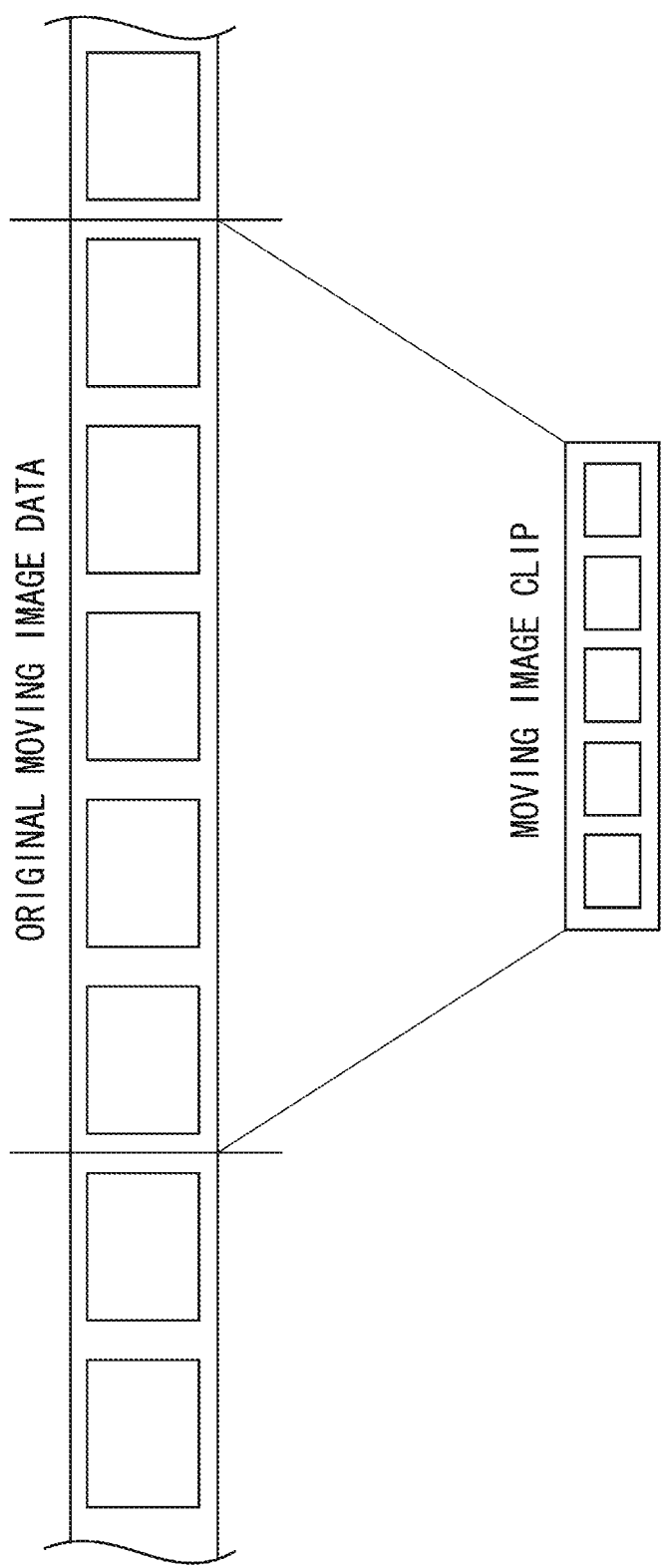
FIG. 3 is a conceptual diagram schematically illustrating a relationship between a moving image clip and original moving image data.

A relationship between a moving image clip recorded in the storage unit 102 and the original moving image data will be described with reference to FIG. 3. FIG. 3 is a conceptual diagram schematically illustrating the relationship between the moving image clip and the original moving image data.

In FIG. 3, the original moving image data is moving image data captured by an image capturing device such as a digital video camera, and such moving image data may have a bit rate or resolution that is too high to be viewed as-is in a mobile terminal or may be in a codec or a format that is not supported by the mobile terminal. Furthermore, there may be a case in which a user wants to clip only a portion of a file of the captured moving image data as a moving image clip.

Thus, in FIG. 3, the moving image clip to be recorded in the mobile terminal is indicated as data obtained by clipping a portion of the original moving image data along a time axis and by reducing the bit rate or the resolution thereof.

The content of the moving image obtaining information will be described. The moving image obtaining information is information for obtaining the original moving image data from which the moving image clip recorded in the mobile terminal has been clipped.

The original moving image data is stored in a PC, a DVR, a NAS, a cloud server, or the like. Thus, the information for obtaining the original moving image data may include uniform resource location (URL) information that indicates the storage location of the original image data.

In addition, when the moving image clip has been obtained by clipping a portion of the original moving image data as described with reference to FIG. 3, the moving image obtaining information may include information that indicates clipping positions.

Based on these pieces of information, the reproduction instruction for obtaining and reproducing the original moving image data may, for example, be as follows. http://cloud-server/contents/movie/20121119/0025.MTS?from=2834&to=3025

A segment "0025.MTS" indicated above is a file name of the original moving image data, and the example described above indicates that the original moving image data is stored on a cloud server. A segment "2834" indicated in a query following the file name indicates a reproduction start position, and a segment "3025" indicates a reproduction end position. Thus, the above content indicates that the second moving image data is instructed to be reproduced from the beginning to the end thereof.

It is to be noted that the reproduction start position and the reproduction end position do not necessary have to match the clipping positions of the moving image clip. In other words, it is possible to specify a position that is not included in a clipping portion or a specific position within a clipping portion.

Figure 4:
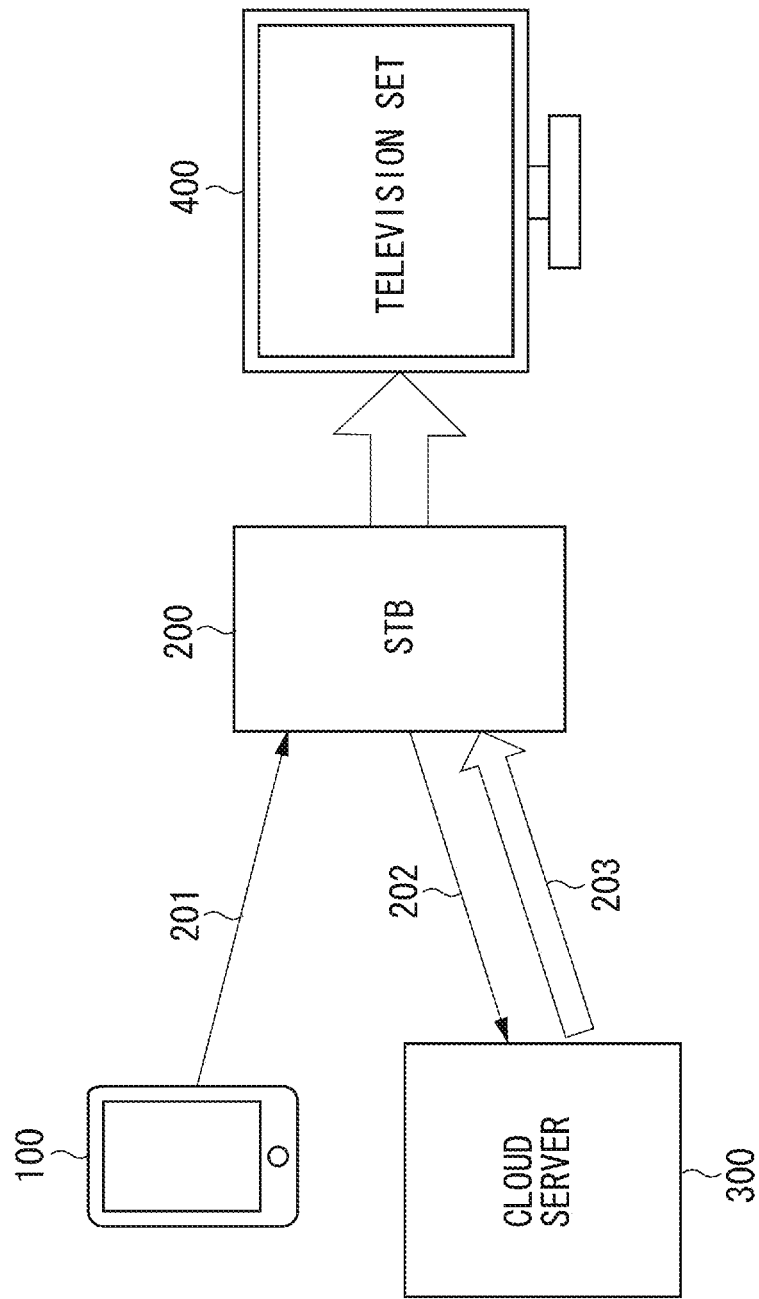
FIG. 4 is a schematic diagram illustrating a flow in which the original moving image data is subjected to reproduction processing through a reproduction instruction transmitted from the reproduction control apparatus according to the exemplary embodiments of the present invention.

A flow in which the original moving image data is subjected to the reproduction processing through a reproduction instruction transmitted from the reproduction control apparatus 100 according to the first exemplary embodiment will be described with reference to FIG. 4. In FIG. 4, an example in which the reproduction control apparatus 100 is configured as a mobile terminal apparatus is illustrated.

Referring to FIG. 4, the reproduction control apparatus 100 first transmits a reproduction instruction 201 of the original moving image data to an STB 200. The content of the reproduction instruction 201 has been described above.

Upon receiving the reproduction instruction 201, the STB 200 transmits, based on the content of the reproduction instruction 201, a message 202 requesting data on a particular portion of the original moving image data to a cloud server 300 provided as a storage apparatus (storage device) that stores the original image data.

Upon receiving the request, the cloud server 300 transmits data 203 of the particular portion of the original moving image data to the STB 200.

Upon receiving the data 203 of the particular portion of the original moving image data, the STB 200 carries out the reproduction processing on the data 203 received from the cloud server 300, and displays a reproduced image on a television set 400 (display device).

In this manner, the reproduction processing on the original image data starts in response to the reproduction instruction 201 transmitted from the reproduction control apparatus 100. Although a case in which the STB 200 and the television set 400 are configured as separate components has been illustrated in the example described above, the STB 200 and the television set 400 may be integrated into a reproduction display apparatus.

A case can be considered in which some of the moving image clips recorded in the mobile terminal having the reproduction control apparatus 100 do not contain moving image obtaining information. Thus, an example of a UI that allows a user to easily recognize as to whether a moving image clip contains moving image obtaining information will be described with reference to FIG. 5.

Figure 5:
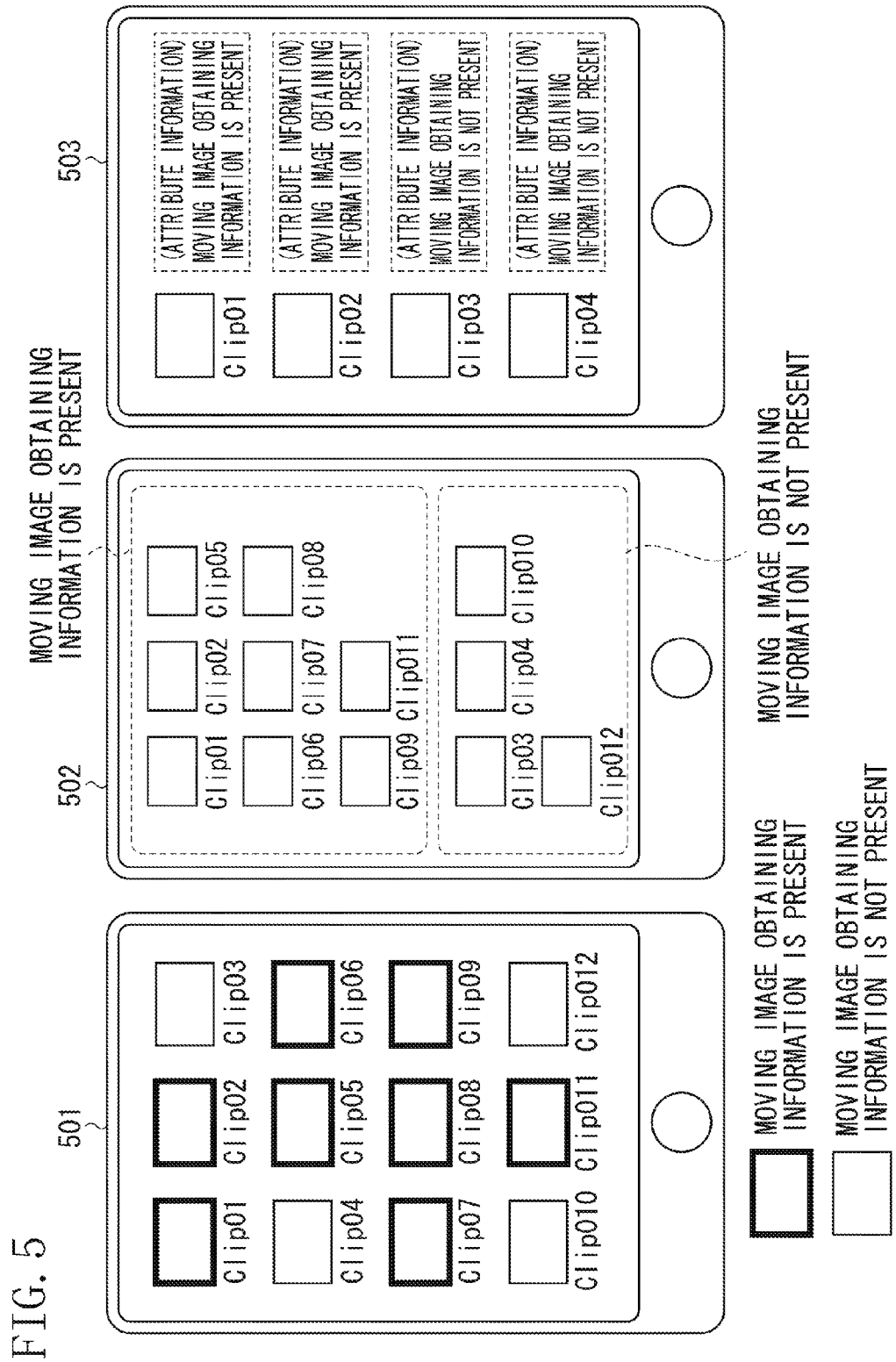
FIG. 5 is a conceptual diagram illustrating an example of a user interface (UI) of a mobile terminal that includes the reproduction control apparatus according to the exemplary embodiments of the present invention.

FIG. 5 is a conceptual diagram illustrating examples of a UI of the mobile terminal that includes the reproduction control apparatus 100. In FIG. 5, a plurality of rectangles indicates thumbnails of moving image clips.

In a UI 501, a frame of a thumbnail of a moving image clip is colored depending on whether the moving image clip contains the moving image obtaining information, and thus the user can recognize, at a glance, the presence or the absence of the moving image obtaining information.

In a UI 502, the moving image clips are divided into groups in accordance with whether the moving image clips contain the moving image obtaining information, and thus the user can recognize, at a glance, the presence or the absence of the moving image obtaining information.

In a UI 503, when the user displays attribute information of a given moving image clip, the presence or the absence of the moving image obtaining information is displayed as one of the items of the attribute information, and thus the user can recognize the presence or the absence of the moving image obtaining information.

In other words, the user can easily recognize the presence or the absence of the moving image obtaining information in the plurality of moving image clips through coloring, grouping, an indication on the UI through the attribute information, or the like.

In the above descriptions given with reference to FIGS. 2 and 4, the flow until the original moving image data is subjected to the reproduction processing has been described.

Hereinafter, a mode in which the moving image clip and the original moving image data are subjected to synchronous reproduction control after the reproduction processing of the original moving image data starts will be described with reference to FIG. 6.

Figure 6:
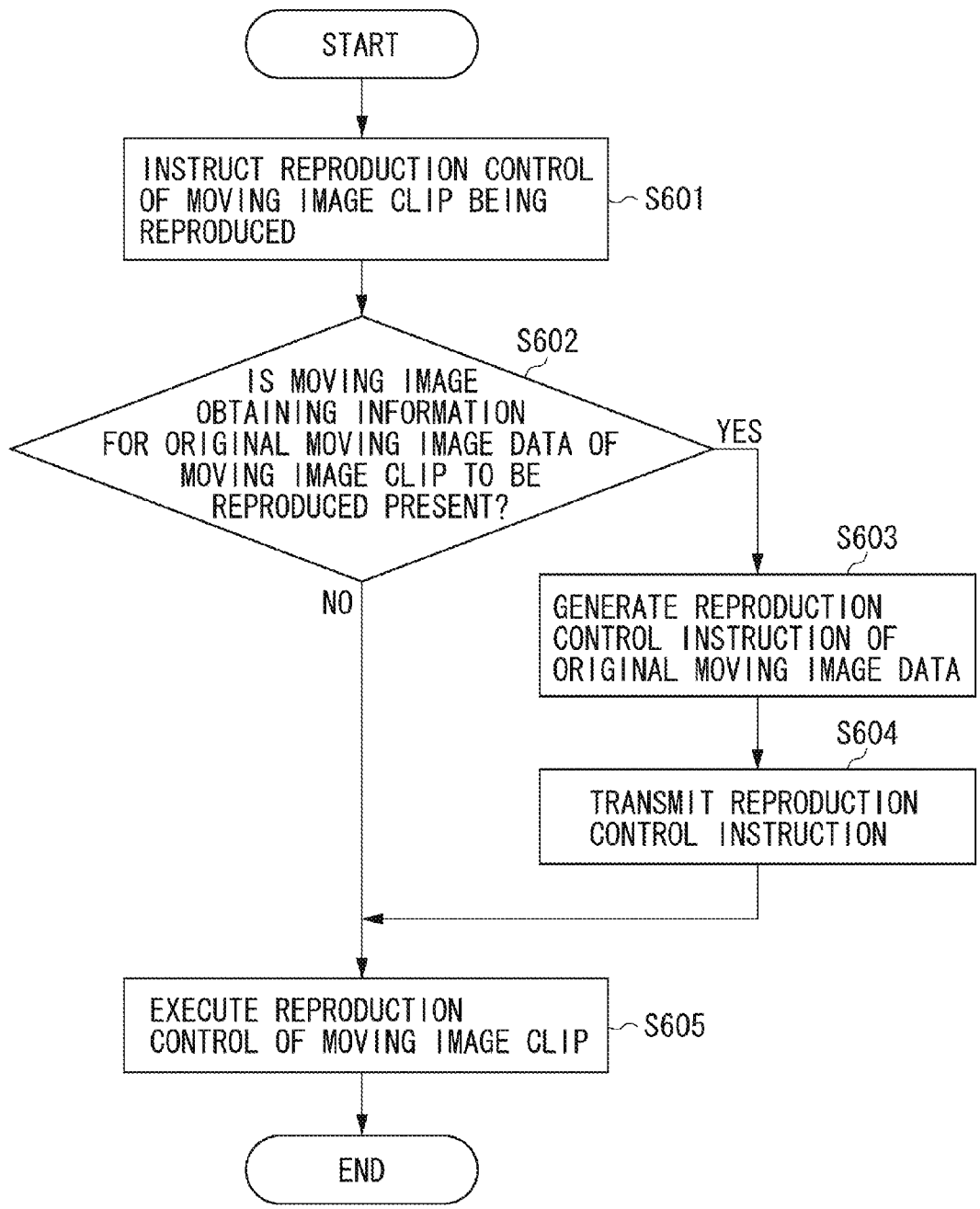
FIG. 6 is a flowchart illustrating another example of the reproduction control procedure in the reproduction control apparatus according to the exemplary embodiments of the present invention.

FIG. 6 is a flowchart illustrating another example of the reproduction control procedure in the reproduction control apparatus 100 according to the first exemplary embodiment.

In the flowchart illustrated in FIG. 2, after the reproduction instruction of the original moving image data has been transmitted in step S204, reproduction of the moving image clip starts in step S205, resulting in a state in which the moving image clip and the original moving image data start to be reproduced substantially simultaneously.

Meanwhile, indicated in the flowchart illustrated in FIG. 6 is a series of processing procedures to be carried out when so-called trick plays such as pausing, fast forward reproduction, slow reproduction, rewind reproduction, and a random access are carried out on the moving image clip after the processing described with reference to the flowchart illustrated in FIG. 2.

Referring to FIG. 6, in step S601, reproduction control is instructed on moving image clip being reproduced, and then in step S602, whether the moving image obtaining information of the original moving image data of the moving image clip is present is checked. If the moving image obtaining information is present (Yes in step S602), in step S603, a reproduction control instruction of the original moving image data is generated.

In step S604, the reproduction control instruction generated in step S603 is transmitted to a reproduction control apparatus that is capable of obtaining and reproducing the original moving image data, and then in step S605, reproduction control is executed on the moving image clip. Meanwhile, if, in step S602, the moving image obtaining information of the original moving image data of the moving image clip is not present (No in step S602), the processing proceeds to step S605, and the reproduction control is executed on the moving image clip.

Here, an example of the reproduction control instruction for a trick play is indicated for each of the cases of pausing, fast forward reproduction (two-fold speed), rewind reproduction, and a random access. http://cloudserver/contents/movie/20121119/0025.MTS?pause=true http://cloudserver/contents/movie/20121119/0025.MTS?speed=x2 http://cloudserver/contents/movie/20121119/0025.MTS?direction=reverse http://cloudserver/contents/movie/20121119/0025.MTS#time=3000

Although a case in which a separate piece of reproduction control information indicated for each of the reproduction control operations has been illustrated in the above examples, a plurality of control instructions may be collected into one. For example, the example below indicates a reproduction instruction for two-fold-speed rewind reproduction. http://cloudserver/contents/movie/20121119/0025.MTS?direction=reverse&speed=x2

The description of the reproduction control instruction indicated herein is merely an example, and as another description method, a reproduction control instruction may be implemented by using, for example, the extensible markup language (XML) or a scheme other than the hypertext transfer protocol (HTTP).

According to the first exemplary embodiment of the present invention, when reproducing the second moving image data that has resolution, a bit rate, or the like converted from that of the first moving image data, a search for a storage location of the first moving image data or a search for a particular scene within the first moving image data can be quickly carried out.

In addition, according to another feature of the first exemplary embodiment of the present invention, synchronous reproduction control of the first moving image data and the second moving image data can be achieved.

Hereinafter, a configuration in which the moving image obtaining information is stored in a location other than the holding unit 105 will be described as a second exemplary embodiment.

In the first exemplary embodiment described above, the moving image obtaining information is recorded in the holding unit 105, but the moving image obtaining information may be recorded in another location as long as the reproduction control apparatus 100 can acquire the moving image obtaining information from that location.

Figure 7:
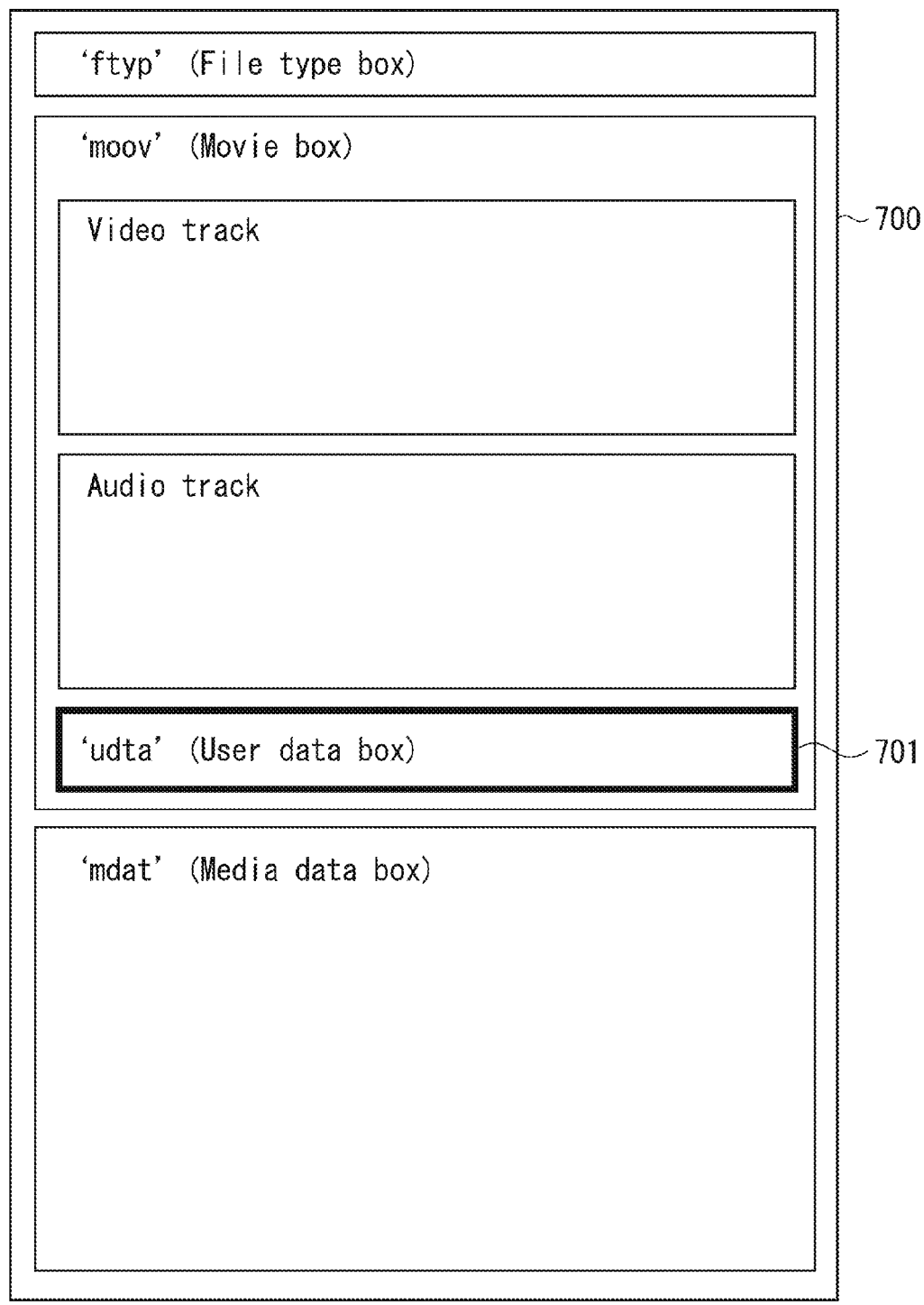
FIG. 7 is a schematic diagram for describing an example in which moving image obtaining information is recorded in a header portion of a moving image clip.

Thus, as an example, a method for recording the moving image obtaining information in a moving image clip will be described with reference to FIG. 7. FIG. 7 is a schematic diagram illustrating an example in which the moving image obtaining information is recorded in a header portion of the moving image clip.

In FIG. 7, a section 700 illustrates an overview of an International Organization for Standardization (ISO) base media file format (hereinafter, abbreviated as ISO BMFF). The ISO BMFF mainly includes ftyp (file type box), moov (movie box), and mdat (media data box). The ftyp indicates a file type, and the moov is a container that contains a box in which various pieces of metadata are stored. In addition, the mdat stores moving image data and audio data.

The moov stores the metadata pertaining to the moving image or the audio stored in the mdat in the form of tracks, and can also store udta (user data box) in which the user can store information as desired. In the second exemplary embodiment, as an example, the moving image obtaining information is stored in a udta 701 illustrated in FIG. 7.

Thus, the moving image obtaining information does not necessarily have to be recorded in the holding unit 105, and may be acquired by reading out the moving image obtaining information from the header of the moving image clip as necessary.

When the storage location of the original moving image data from which the moving image clip has been clipped is changed, the URL included in the moving image obtaining information may end up pointing a wrong location. As a first method to address such an issue, a method that utilizes, for example, a management server capable of managing the moving image obtaining information will be described.

Specifically, when the storage location of the original moving image data has been changed, the moving image obtaining information managed in the management server is updated immediately, and thus the moving image obtaining information can always be kept up-to-date.

Here, it is desirable that the management server can be accessed through a network from a mobile terminal in which the moving image clip is recorded.

In addition, as a second method for handling a situation in which the storage location of the original moving image data has been changed, a method that utilizes an e-mail will be described.

In this method, when the storage location of the original moving image data has been changed, an e-mail message is transmitted to the mobile terminal to notify of the content of the change. Upon receiving the notification of the change, the mobile terminal updates the moving image obtaining information as appropriate, and can thus always keep the moving image obtaining information up-to-date.

Furthermore, as a third method for handling a situation in which the storage location of the original moving image data has been changed, a method that utilizes redirect information will be described.

In this method, when the storage location of the original moving image data has been changed, information on a changed storage location is left at the storage location prior to the change. When the mobile terminal accesses, in accordance with the moving image obtaining information, the location where the original moving image data was stored, the mobile terminal is redirected to the changed storage location, and thus can update the moving image obtaining information.

As thus far described, although points that differ from those of the first exemplary embodiment with regard to the storage location of the moving image obtaining information and the method for updating the storage location have been described in the second exemplary embodiment, the storage location can be set either inside or outside the reproduction control apparatus 100 as long as that location can be referred to when the moving image obtaining information is necessary.

According to the present exemplary embodiments, when reproducing the second moving image data that has resolution, a bit rate, or the like converted from that of the first moving image data, a search for a storage location of the first moving image data or a search for a particular scene within the first moving image data can be quickly carried out.

In addition, according to another feature of the present exemplary embodiments, synchronous reproduction control of the first moving image data and the second moving image data can be achieved.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-078477 filed Apr. 4, 2013, which is hereby incorporated by reference herein in its entirety.

What is claimed is:

1. A control apparatus, comprising:
a reproduction unit configured to reproduce a plurality of pieces of second moving image data of which at least one of a bit rate, a frame rate, and resolution has been converted from that of first moving image data so that the at least one of the bit rate, the frame rate, and the resolution is reduced, the second moving image data being stored in a storage unit capable of storing the plurality of pieces of second moving image data of which at least one of a bit rate, a frame rate, and resolution has been converted from that of a first moving image data;
a generation unit configured to, in a case where a predetermined piece of second moving image data is selected from the plurality of pieces of second moving image data stored in the storage unit, generate a reproduction instruction to reproduce the first moving image data corresponding to the predetermined piece of second moving image data;
a communication unit configured to transmit the reproduction instruction generated by the generation unit to a reproduction control device; and
a control unit configured to determine whether information indicating a location where the first moving image corresponding to the predetermined piece of second moving image is recorded is stored in the storage unit, in a case where the predetermined piece of second moving image data is selected from the plurality of pieces of second moving image data stored in the storage unit,
wherein in a case where the information is stored in the storage unit, the control unit is configured to cause the generation unit to generate the reproduction instruction to reproduce the first moving image corresponding to the predetermined piece of second moving image, and
wherein in a case where the information is not stored in the storage unit, the control unit is configured not to cause the generation unit to generate the reproduction instruction to reproduce the first moving image corresponding to the predetermined piece of second moving image but to cause the reproduction unit to reproduce the predetermined piece of second moving image data.

2. The control apparatus according to claim 1,
wherein the generation unit is configured to generate a reproduction control instruction to control reproduction of the first moving image data in response to an instruction to control reproduction of the second moving image data to be reproduced by the reproduction unit, and
wherein the communication unit is configured to transmit the reproduction control instruction to be generated by the generation unit to the reproduction control device.

3. The control apparatus according to claim 1, wherein the reproduction control instruction is an instruction for pausing, fast forward reproduction, slow reproduction, rewind reproduction, or random access reproduction.

4. The control apparatus according to claim 1, wherein the second moving image data is moving image data obtained by clipping moving image data of a duration corresponding to a portion of the first moving image data, and
wherein the reproduction instruction includes information indicating a start position of the second moving image data in the first moving image data.

5. The control apparatus according to claim 1, wherein the second moving image data is moving image data obtained by clipping moving image data of a duration corresponding to a portion of the first moving image data, and
wherein the reproduction instruction includes information indicating an end position of the second moving image data in the first moving image data.

6. The control apparatus according to claim 1, wherein the reproduction instruction is a reproduction instruction to instruct reproduction of a portion of the second moving image data spanning from the beginning to the end.

7. The control apparatus according to claim 1, wherein the information is recorded in a header portion of the second moving image data as metadata.

8. The control apparatus according to claim 1, wherein the reproduction unit is configured to display information that indicates whether the second moving image data contains the information obtained.

9. The control apparatus according to claim 1,
wherein in a case where the predetermined piece of second moving image data is selected from the plurality of second moving image data stored in the storage unit, the control unit is configured to determine whether information indicating a location where the first moving image corresponding to the predetermined piece of second moving image is recorded is stored in the storage unit,
wherein in a case where the information is stored in the storage unit, the control unit is configured to cause the generation unit to generate the reproduction instruction to reproduce the first moving image corresponding to the predetermined piece of second moving image, and
wherein in a case where the information is not stored in the storage unit, the control unit is configured not to cause the generation unit to generate the reproduction instruction to reproduce the first moving image corresponding to the predetermined piece of second moving image but to cause the reproduction unit to reproduce the predetermined piece of second moving image data.

10. A control method, comprising:
reproducing a plurality of pieces of second moving image data of which at least one of a bit rate, a frame rate, and resolution has been converted from that of first moving image data so that the at least one of the bit rate, the frame rate, and the resolution is reduced, the second moving image data being stored in a storage unit capable of storing the plurality of pieces of second moving image data of which at least one of a bit rate, a frame rate, and resolution has been converted from that of a first moving image data;

in a case where a predetermined piece of second moving image data is selected from the plurality of pieces of second moving image data stored in the storage unit, generating a reproduction instruction to reproduce the first moving image data corresponding to the predetermined piece of second moving image data; and transmitting the reproduction instruction generated to a reproduction control device, determining whether information indicating a location where the first moving image corresponding to the predetermined piece of second moving image is recorded is stored in the storage unit, in a case where the predetermined piece of second moving image data is selected from the plurality of pieces of second moving image data stored in the storage unit, wherein in a case where the information is stored in the storage unit, generating the reproduction instruction to reproduce the first moving image corresponding to the predetermined piece of second moving image, and wherein in a case where the information is not stored in the storage unit, the reproduction instruction to reproduce the first moving image corresponding to the predetermined piece of second moving image but to cause the reproduction of the predetermined piece of second moving image data is not generated.

11. A non-transitory computer-readable recording medium storing a program causing a computer to perform a method comprising:

reproducing a plurality of pieces of second moving image data of which at least one of a bit rate, a frame rate, and resolution has been converted from that of first moving image data so that the at least one of the bit rate, the frame rate, and the resolution is reduced, the second moving image data being stored in a storage unit capable of storing the plurality of pieces of second moving image data of which at least one of a bit rate, a frame rate, and resolution has been converted from that of a first moving image data;

in a case where a predetermined piece of second moving image data is selected from the plurality of pieces of second moving image data stored in the storage unit, generating a reproduction instruction to reproduce the first moving image data corresponding to the predetermined piece of second moving image data; and transmitting the reproduction instruction generated to a reproduction control device, determining whether information indicating a location where the first moving image corresponding to the predetermined piece of second moving image is recorded is stored in the storage unit, in a case where the predetermined piece of second moving image data is selected from the plurality of pieces of second moving image data stored in the storage unit, wherein in a case where the information is stored in the storage unit, generating the reproduction instruction to reproduce the first moving image corresponding to the predetermined piece of second moving image, and wherein in a case where the information is not stored in the storage unit, the reproduction instruction to reproduce the first moving image corresponding to the predetermined piece of second moving image but to cause the reproduction unit to reproduce the predetermined piece of second moving image data is not generated.

* * * * *